United States Patent
Lee et al.

(10) Patent No.: US 7,861,162 B2
(45) Date of Patent: Dec. 28, 2010

(54) HELP FILE GENERATING METHOD AND APPARATUS

(75) Inventors: Seung-wan Lee, Suwon-si (KR); Dmitry Evgenievich Smirnov, Volzhsky town (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 10/986,883

(22) Filed: Nov. 15, 2004

(65) Prior Publication Data

US 2005/0125729 A1    Jun. 9, 2005

(30) Foreign Application Priority Data

Nov. 14, 2003 (KR) ............... 10-2003-0080554
Aug. 4, 2004 (KR) ............... 10-2004-0061421

(51) Int. Cl.
G06F 17/00 (2006.01)

(52) U.S. Cl. ..................... 715/255; 715/714

(58) Field of Classification Search ............ 715/500, 715/530, 531, 705, 714, 200, 255
See application file for complete search history.

(56) References Cited

U.S. PATENT DOCUMENTS

| | | | | |
|---|---|---|---|---|
| 5,027,293 A * | 6/1991 | Pung et al. | .................. | 702/185 |
| 5,361,361 A | 11/1994 | Hickman | | |
| 5,363,204 A * | 11/1994 | Millman | .................... | 358/406 |
| 5,544,325 A * | 8/1996 | Denny et al. | ................ | 709/236 |
| 5,600,778 A * | 2/1997 | Swanson et al. | ............ | 715/762 |
| 5,603,034 A * | 2/1997 | Swanson | .................... | 717/111 |
| 5,661,517 A * | 8/1997 | Budow et al. | ................ | 725/60 |
| 5,804,810 A * | 9/1998 | Woolley et al. | ............ | 235/492 |
| 5,835,918 A * | 11/1998 | Walls et al. | ................ | 715/513 |
| 5,933,140 A * | 8/1999 | Strahorn et al. | ............ | 715/712 |

(Continued)

FOREIGN PATENT DOCUMENTS

JP    11-316636    11/1999

(Continued)

OTHER PUBLICATIONS

Moriyon, Automatic Generation of Help from Interface Design Models, ACM 1994, pp. 1-7.*

(Continued)

*Primary Examiner*—Cong-Lac Huynh
(74) *Attorney, Agent, or Firm*—Stazione & Kim, LLP

(57) ABSTRACT

A method of generating a help file used commonly in different models of image forming apparatuses includes reading a setting value indicating a function provided by one of the image forming apparatuses, setting a field value of a parameter corresponding to the read setting value, and configuring a help message based on the set field value of the parameter. A system to generate a help message includes a configuration module to determine identification information regarding each of a plurality of functions of an object included in one of software versions and characteristic data regarding the software version, and a universal help file including function descriptions for all of the software versions provided in a computer, receiving the identification information and the characteristic data, and generating the help message regarding the object using the function descriptions according to the identification information and the characteristic data. The function descriptions include a section filled with the characteristic data.

13 Claims, 8 Drawing Sheets

U.S. PATENT DOCUMENTS

| | | | |
|---|---|---|---|
| 6,148,346 A * | 11/2000 | Hanson | 719/321 |
| 6,208,338 B1 * | 3/2001 | Fischer et al. | 715/705 |
| 6,226,096 B1 * | 5/2001 | Ouchi | 358/1.14 |
| 6,236,989 B1 * | 5/2001 | Mandyam et al. | 1/1 |
| 6,246,404 B1 * | 6/2001 | Feigner et al. | 715/708 |
| 6,289,370 B1 * | 9/2001 | Panarello et al. | 709/200 |
| 6,339,436 B1 * | 1/2002 | Amro et al. | 715/714 |
| 6,427,177 B1 * | 7/2002 | Chang | 710/8 |
| 6,452,607 B1 * | 9/2002 | Livingston | 715/705 |
| 6,505,243 B1 * | 1/2003 | Lortz | 709/220 |
| 6,628,311 B1 * | 9/2003 | Fang | 715/777 |
| 6,788,313 B1 * | 9/2004 | Heil | 715/705 |
| 6,799,205 B2 * | 9/2004 | Ludtke | 709/220 |
| 6,934,889 B2 * | 8/2005 | Owari | 714/46 |
| 6,961,789 B2 * | 11/2005 | McIntyre | 710/62 |
| 7,111,250 B1 * | 9/2006 | Hayward et al. | 715/826 |
| 7,127,675 B1 * | 10/2006 | Kates et al. | 715/705 |
| 7,506,257 B1 * | 3/2009 | Chavez et al. | 715/714 |
| 2002/0010724 A1 * | 1/2002 | Sterling et al. | 707/530 |
| 2002/0015056 A1 * | 2/2002 | Weinlaender | 345/705 |
| 2002/0023144 A1 * | 2/2002 | Linyard et al. | 709/218 |
| 2002/0078262 A1 | 6/2002 | Harrison | |
| 2002/0113993 A1 * | 8/2002 | Reddy | 358/1.15 |
| 2003/0016238 A1 * | 1/2003 | Sullivan et al. | 345/705 |
| 2003/0018835 A1 * | 1/2003 | Nonaka | 710/5 |
| 2003/0018844 A1 * | 1/2003 | Akiyama | 710/305 |
| 2003/0036909 A1 * | 2/2003 | Kato | 704/275 |
| 2003/0048473 A1 * | 3/2003 | Rosen | 358/1.15 |
| 2003/0058266 A1 * | 3/2003 | Dunlap et al. | 345/705 |
| 2003/0110484 A1 * | 6/2003 | Famolari | 717/173 |
| 2003/0122859 A1 * | 7/2003 | Aggarwal et al. | 345/708 |
| 2003/0200291 A1 * | 10/2003 | Kemp et al. | 709/222 |
| 2003/0200292 A1 * | 10/2003 | Kemp et al. | 709/222 |
| 2004/0024882 A1 * | 2/2004 | Austin et al. | 709/227 |
| 2004/0130565 A1 * | 7/2004 | Fujita et al. | 345/705 |
| 2004/0162890 A1 * | 8/2004 | Ohta | 709/218 |
| 2004/0197029 A1 * | 10/2004 | Brundage et al. | 382/306 |
| 2004/0263900 A1 * | 12/2004 | Nguyen et al. | 358/1.15 |
| 2005/0078968 A1 * | 4/2005 | Ohta | 399/8 |
| 2005/0081154 A1 * | 4/2005 | Vogel | 715/710 |
| 2005/0138559 A1 * | 6/2005 | Santos-Gomez et al. | 715/709 |
| 2005/0146743 A1 * | 7/2005 | Firooz | 358/1.15 |
| 2005/0146754 A1 * | 7/2005 | Firooz | 358/440 |
| 2005/0154985 A1 * | 7/2005 | Burkhart et al. | 715/705 |
| 2005/0154986 A1 * | 7/2005 | Bartek et al. | 715/714 |
| 2005/0262383 A1 * | 11/2005 | Sierer et al. | 714/4 |
| 2005/0268234 A1 * | 12/2005 | Rossi et al. | 715/705 |
| 2006/0116883 A1 * | 6/2006 | Kawamura et al. | 704/271 |
| 2006/0294050 A1 * | 12/2006 | McRoberts et al. | 707/1 |
| 2007/0156648 A1 * | 7/2007 | Bridges et al. | 707/3 |

FOREIGN PATENT DOCUMENTS

KR      2001-79781      8/2001

OTHER PUBLICATIONS

Paterno, Automatic Generation of Task-oriented Help, ACM 1995, pp. 181-186.*

Korean Official Action issued on Jul. 29, 2005, for Korean Patent Application No. 10-2003-0080554.

* cited by examiner

HELP FILE GENERATING METHOD AND APPARATUS

CROSS-REFERENCE TO RELATED APPLICATIONS

This application claims the priority of Korean Patent Application Nos. 2003-80554 and 2004-61421, filed on Nov. 14, 2003 and Aug. 4, 2004, respectively, in the Korean Intellectual Property Office, the disclosures of which are incorporated herein in its entirety by reference.

BACKGROUND OF THE INVENTION

1. Field of the Invention

The present general inventive concept relates to a help file generating method and apparatus and a help message generating system and method, and more particularly, to a method and apparatus to generate a help file used commonly in different models of image forming apparatuses, which are capable of adding to a help message descriptions of different functions of the different models of the image forming apparatuses, and a system and method of generating the help message for a different software version.

2. Description of the Related Art

In general, a driver for an image forming apparatus is installed in a computer to drive the image forming apparatus, such as a printer or a multi-functional device (MFD). The MFD is a device that includes functions of a printer, a copier, a scanner, and the like. The driver provides a user with a help message describing the functions of each image forming apparatus so as to help the user. Since the help message is dependent on a model of each image forming apparatus, a plurality of help messages should be provided to correspond to respective image forming apparatuses.

An example of a method of providing such a help message is disclosed in U.S. Pat. No. 5,361,361.

FIG. 1 is a diagram showing conventional help messages corresponding to respective printers. Referring to FIG. 1, a first printer driver for driving a first printer 112 is installed in a computer, and a user interface 114 of the first printer driver provides a first printer driver user with a first help message 116 describing a function of the first printer 112. Further, a second printer driver user interface 124 of a second printer 122 provides the user with a second help message 126, and a third printer driver user interface 134 of a third printer 132 provides the user with a third help message 136.

As described above, different models of printers generate their own help messages. Generally, only a small number of functions are different in among the printers while most of the contents of the help messages are identical except descriptions of the different functions. However, although there is a common part in the help message of each model, help messages corresponding to the respective models should be provided to indicate the descriptions of the different functions. Therefore, there is a drawback in that producing a driver including a help file causes a waste of time.

In addition, in a case of original manufacturer (OEM), only the OEM's name needs to be changed in a help message. Even in this case, a new help message needs to be generated by changing the OEM's name, and a driver including the help message needs to be produced.

SUMMARY OF THE INVENTION

The present general inventive concept provides a method of generating a help file used commonly in different models of image forming apparatuses, which is capable of adding to a help message descriptions of different functions of each of the image forming apparatuses.

The present general inventive concept also provides an apparatus to generate a help file used commonly in different models of image forming apparatuses, which is capable of adding to a help message descriptions of different functions of each of the image forming apparatus.

The present general inventive concept also provides a system to generate a help message for a different software version.

The present general inventive concept also provides a method of generating a help message for a different software version.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a method of generating a help file used commonly in different models of image forming apparatuses, so that descriptions of different functions of the image forming apparatuses connected to a computer are added to a help message. The method may include reading a setting value indicating a function provided by the image forming apparatus, setting a field value of a parameter corresponding to the read setting value, and configuring the help message based on the set field value of the parameter.

The foregoing and/or other aspects and advantages of the present general inventive concept may also be achieved by providing an apparatus to generate a help file used commonly in different models of image forming apparatuses, so that descriptions of different functions of the image forming apparatus connected to a computer are added to a help message. The apparatus may include a first unit to read a setting value indicating a function provided by the image forming apparatus, a second unit to set a field value of a parameter corresponding to the read setting value, and a third unit to configure the help message based on the set field value of the parameter.

The foregoing and/or other aspects and advantages of the present general inventive concept may also be achieved by providing a system to generate a help message regarding a particular one of a plurality of objects included in a particular one of a plurality of software versions in a computer. The system may include a configuration module to determine identification information regarding each of a plurality of functions of the particular object included in the particular software version and characteristic data regarding the particular software version, and a universal help file comprising function descriptions for all of the software versions provided in the computer, to receive the identification information and the characteristic data, and to generate the help message regarding the particular object using the function descriptions according to the identification information and the characteristic data. In this case, the function descriptions may include a section filled with the characteristic data.

The foregoing and/or other aspects and advantages of the present general inventive concept may also be achieved by providing a method of generating a help message regarding a particular one of a plurality of objects included in a particular one of a plurality of software versions in a system. The method may include receiving a request to provide the help message regarding the particular object included in the particular software version, determining identification information regarding each of a plurality of functions of the particular object and characteristic data regarding the particular software version in response to the request, and generating the help message regarding the particular object using the function descriptions according to the identification information and the characteristic data in a universal help file comprising function descriptions for the software versions provided in the computer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
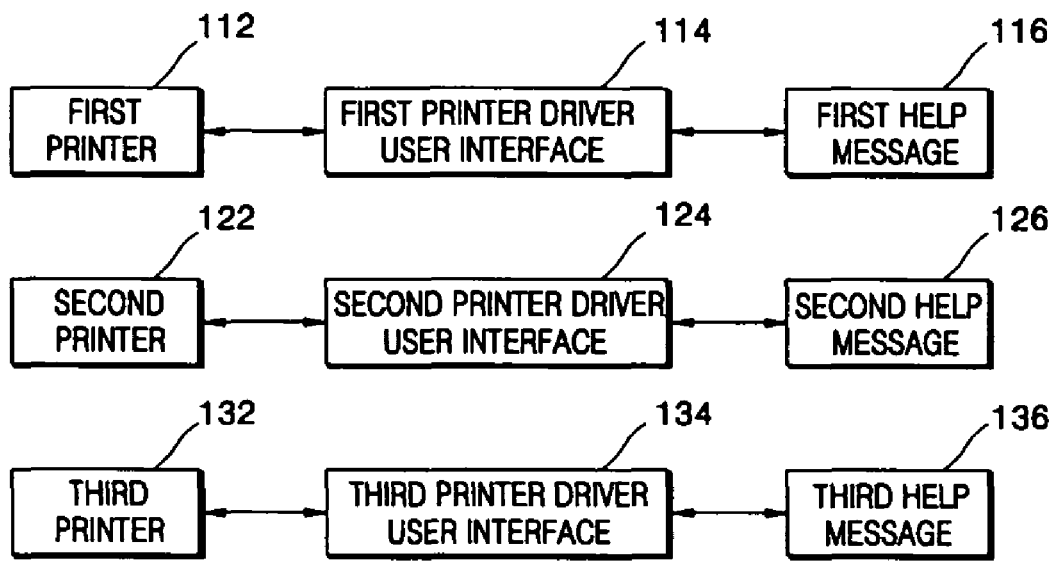
FIG. 1 is a diagram showing a conventional help message corresponding to each printer.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
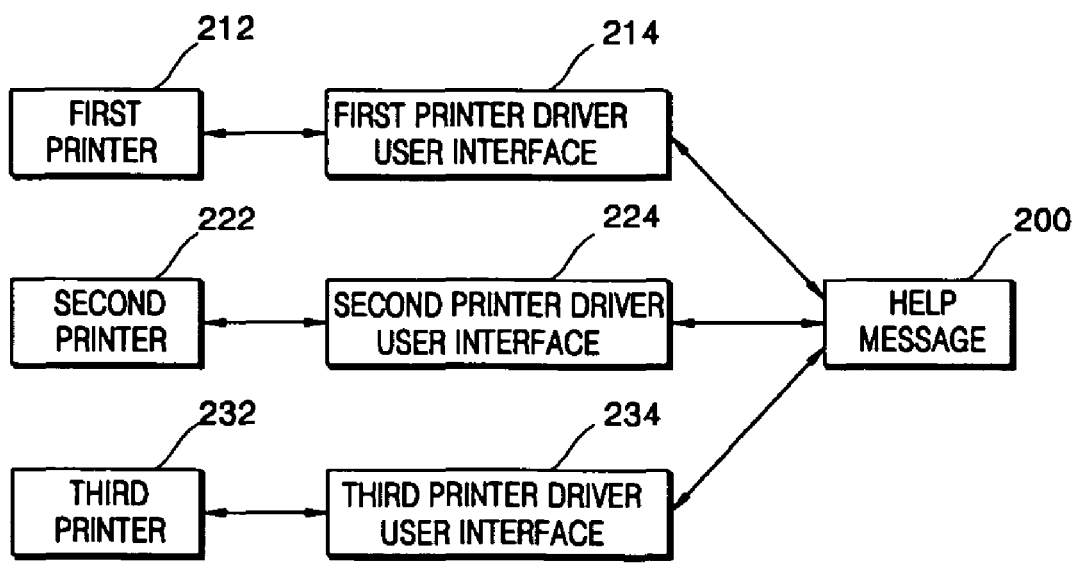
FIG. 2 is a diagram showing a common help message according to an embodiment of the present general inventive concept.

FIG. 2 is a diagram showing a common help message 200 according to an embodiment of the present general inventive concept. Referring to FIG. 2, a first printer driver to drive a first printer 212 is installed in a computer, and a first printer driver user interface 214 of the first printer driver provides a user with the help message 200 describing functions of the first printer 212. Further, in order to describe functions of a second printer 222 and a third printer 232, second and third printer driver user interfaces 224 and 234 provide the user with the help message 200. It is noted that the help message 200 includes slightly different contents corresponding to different types of printers having slightly different functions. That is, the help message 200 can be configured by adding or deleting descriptions of the different functions to or from a common content. The help message may have a first section in which at least one of common functions is described, and a second section in which at least one of the different functions corresponding to a respective one of the first, second, and third printers 212, 222, and 232 is added. That is, the help message may be modified, added, or deleted according to the common functions or the different functions.

Figure 3:
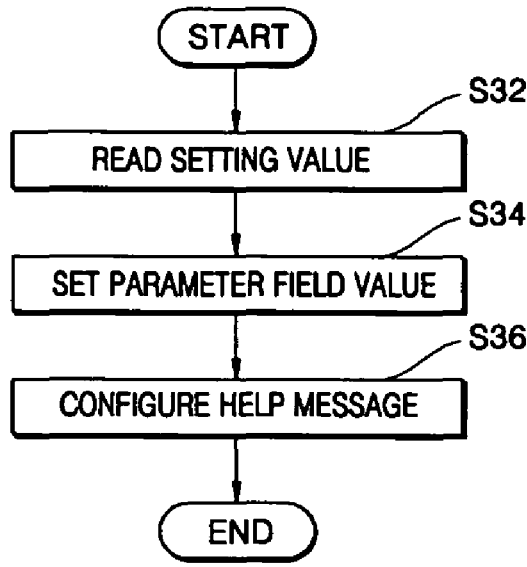
FIG. 3 is a flowchart showing a help file generating method according to another embodiment of the present general inventive concept.

FIG. 3 is a flowchart showing a help file generating method according to another embodiment of the present general inventive concept. The method may include generating a help file used commonly in different models of a plurality of image forming apparatuses, so that descriptions of different functions of the image forming apparatuses connected to a computer can be added to a help message. Referring to FIG. 3, in operation S32, a setting value indicating a function provided by the image forming apparatus is read. Then, in operation S34, a field value of a parameter corresponding to the read setting value is set. Then, in operation S36, the help message is configured based on the set field value of the parameter. Further, the configured help message can be displayed on a monitor of the computer.

The help file can be generated using hypertext markup language (HTML). For example, the help file is a compiled HTML file. Also, the help file can be generated using a JavaScript program.

In operation S32, the setting value is read from a driver configuration file of the image forming apparatus, that is, an initialization (INI) file or a registry file.

In operation S34, the field value of the parameter is set as one when the setting value corresponding to a predetermined function indicates that the function is provided by the image forming apparatus.

In operation S36, the help message is configured by adding thereto a description of the function corresponding to the parameter, when the field value of the parameter is set as one, and the help message is configured by deleting therefrom a description of the function corresponding to the parameter, when the field value of the parameter is not set as one.

Figure 4:
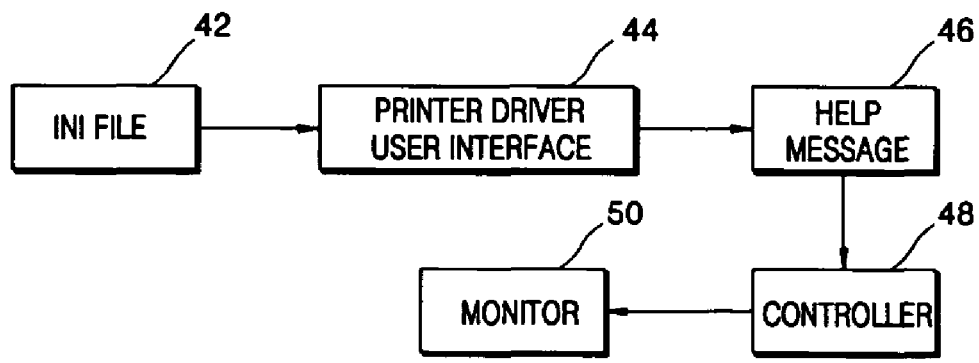
FIG. 4 is a block diagram showing a help file generating apparatus according to another embodiment of the present general inventive concept.

FIG. 4 is a block diagram showing a help file generating apparatus according to another embodiment of the present general inventive concept. The apparatus may generate a help file used commonly in a plurality of different models of image forming apparatuses. The apparatus may add to a help message at least one of descriptions of different functions of the image forming apparatuses connected to a computer. The apparatus includes a printer driver user interface 44 which reads a setting value indicating a function provided by each image forming apparatus, sets a field value of a parameter corresponding to the read setting value, and configures the help message based on the set field value of the parameter.

Moreover, the printer driver user interface 44 sends the configured help message 46 to a controller 48 of the computer. The configured help message 46 can be displayed on a monitor 50 of the computer under the control of the controller 48.

The help file can be generated using hypertext markup language (HTML). For example, the help file can be a compiled HTML file. Also, the help file can be generated using a JavaScript program.

The printer driver user interface 44 reads the setting value from a driver configuration file of the image forming apparatus, that is, an initialization (INI) file 42 or a registry file. For example, the INI file 42 can include the following setting values.

LayoutRotate=1
LayoutBooklet=1

LayoutDoubleSided=0
...
LayoutMultiple=1

Here, LayoutRotate indicates a function of rotating a printing direction of a document by 180°. LayoutBooklet indicates a function capable of printing a document in the form of a book. LayoutDoubleSided indicates a function capable of printing a double-sided document. LayoutMultiple indicates a function capable of printing several pages of a document on one side of a sheet. The setting value of the function can be zero or one. In the above example, the setting values of LayoutRotate, LayoutBooklet, and LayoutMultiple are one, thus the corresponding functions are provided. However, the setting value of LayoutDoubleSided is zero, thus the corresponding function is not provided.

The printer driver user interface 44 sets the field value of the parameter as one when a setting value of a function provided by the image forming apparatus is one. For example, the following parameter field values corresponding to setting values are included in the INI file.

Figure 5:
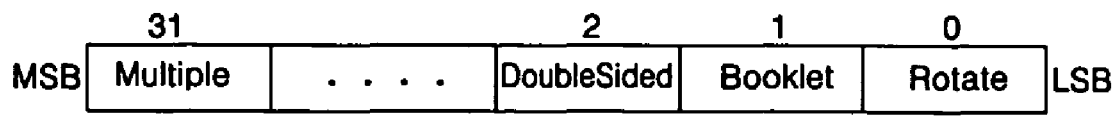
FIG. 5 is a diagram showing a description of parameter fields in the help file generating apparatus of FIG. 4.

0×1—LayoutRotate
0×2—LayoutBooklet
0×4—LayoutDoubleSided
...
0×8000—LayoutMultiple The above parameter field values each may include 4 bytes of data, as shown in FIG. 5. FIG. 5 is a diagram showing parameter fields. Referring to FIG. 5, the least significant bit, that is, bit 0, indicates a parameter field indicating a rotate function. That is, when the bit 0 of the parameter value corresponding to the rotate function is 1, the image forming apparatus can provide a function of rotating a printing direction of a document by 180°. On the other hand, when the bit 0 is 0, the image forming apparatus does not provide the function of rotating the printing direction of the document by 180°. Then, bit 1 indicates a parameter field corresponding to a function capable of printing a document in the form of a book, and bit 2 indicates a parameter field corresponding to a function capable of printing a double-sided document. The most significant bit, that is, bit 31, indicates a parameter field corresponding to a function capable of printing several pages of a document on one side of a sheet.

Figure 6:
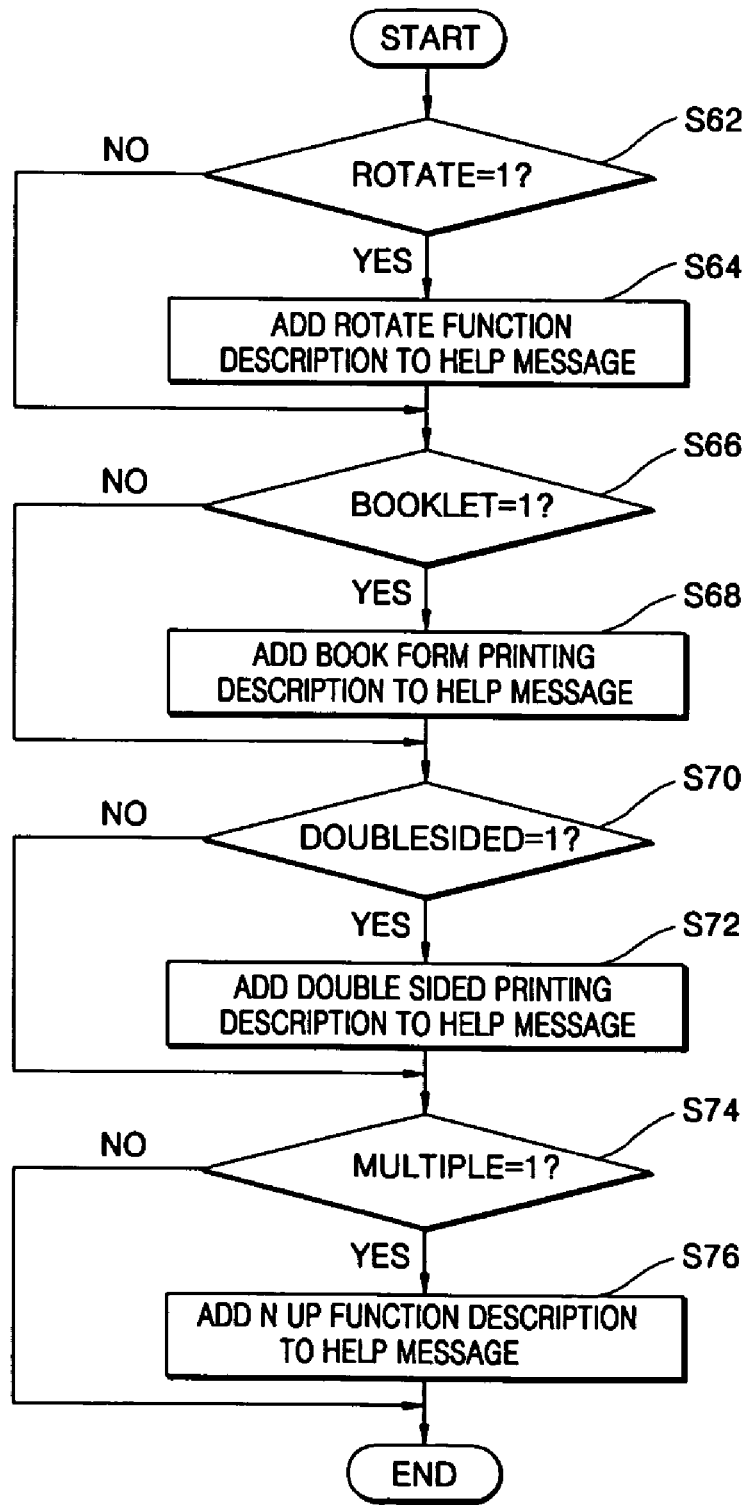
FIG. 6 is a flowchart showing a method of adding descriptions of functions to a help message.

FIG. 6 is a flowchart showing a method of adding descriptions of functions to a help message. When an HTML file used as a help file is opened to generate a help message, descriptions of functions corresponding to the parameter field values are added to the help message. Such an example will be described with reference to FIG. 6.

In operation S62, it is determined whether a Rotate field is set as one. If the Rotate field is set as one, a description of a rotate function is added to the help message in operation S64. If the Rotate field is not set as one, the description of the rotate function is not added to the help message. Alternatively, if the Rotate field is not set as one, the description of the rotate function can be deleted from the help message.

Then, in operation S66, it is determined whether a Booklet field is set as one. If the Booklet field is set as one, a description of a book form printing function is added to the help message in operation S68. If the Booklet field is not set as one, the description of the book form printing function is not added to the help message. Alternatively, if the Booklet field is not set as one, the description of the book form printing function can be deleted from the help message.

Then, in operation S70, it is determined whether a Double-Sided field is set as one. If the DoubleSided field is set as one, a description of a double sided printing function is added to the help message in operation S72. If the DoubleSided field is not set as one, the description of the double sided printing function is not added to the help message.

Then, in operation S74, it is determined whether a Multiple field is set as one. If the Multiple field is set as one, a description of an N up function, that is, a function capable of printing several pages of a document on one side of a sheet is added to the help message in operation S76. If the Multiple field is not set as one, the description of the N up function is not added to the help message, and the operation ends.

Here, it is noted that more than 4 descriptions of functions of the parameter fields can be added to the help message. Moreover, parameters can be generated based on each tab in a menu generated from the help file.

The parameter fields can be used in the help file, that is, the HTML file. Further, the HTML file can be generated using a JavaScript program. A part of an example of generating the help file using the JavaScript program according to the present general inventive concept is provided as follows.

```
<SCRIPT FOR=window EVENT=onload LANGUAGE="Jscript">
...
if((layout_param & 1) == 0)
LayoutRotate.removeNode(true);
Else
Options +="Rotate";
...
...
</SCRIPT>
<BODY>
...
<P ID=LayoutRotate>The user can get a reverse portrait and landscape
with the <B>Rotate 180
Degrees</B>.
...
...
</BODY>
</HTML>
```

The upper part of the HTML file is used to determine whether the Rotate parameter field is set as one. If the Rotate parameter field equals zero in the conditional expression, a rotate function will not be provided in an image forming apparatus, and thus, a description of a rotate function will not be added to a help message. Meanwhile, the lower part of the HTML file is used to add the description of the rotate function to the help message, when the Rotate parameter field is set as one.

Figure 7A:
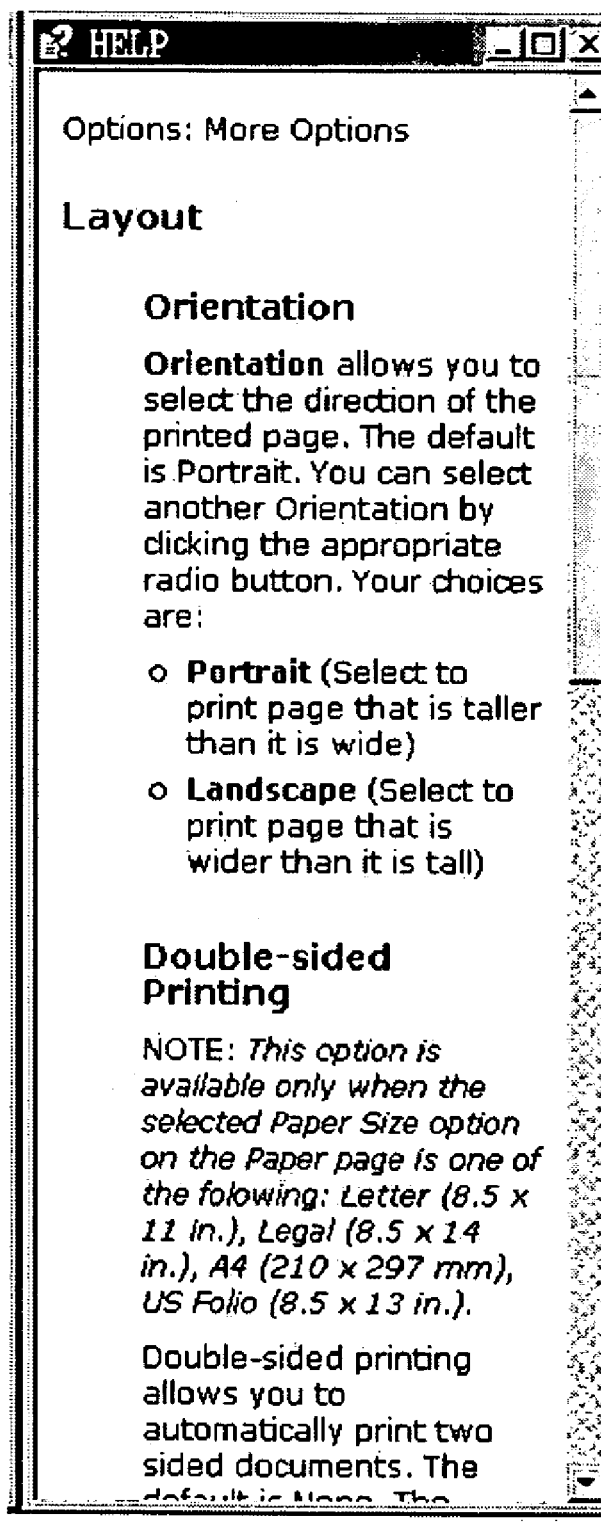
FIG. 7A is a diagram showing a help message without a rotate function in the method of FIG. 6.
Figure 7B:
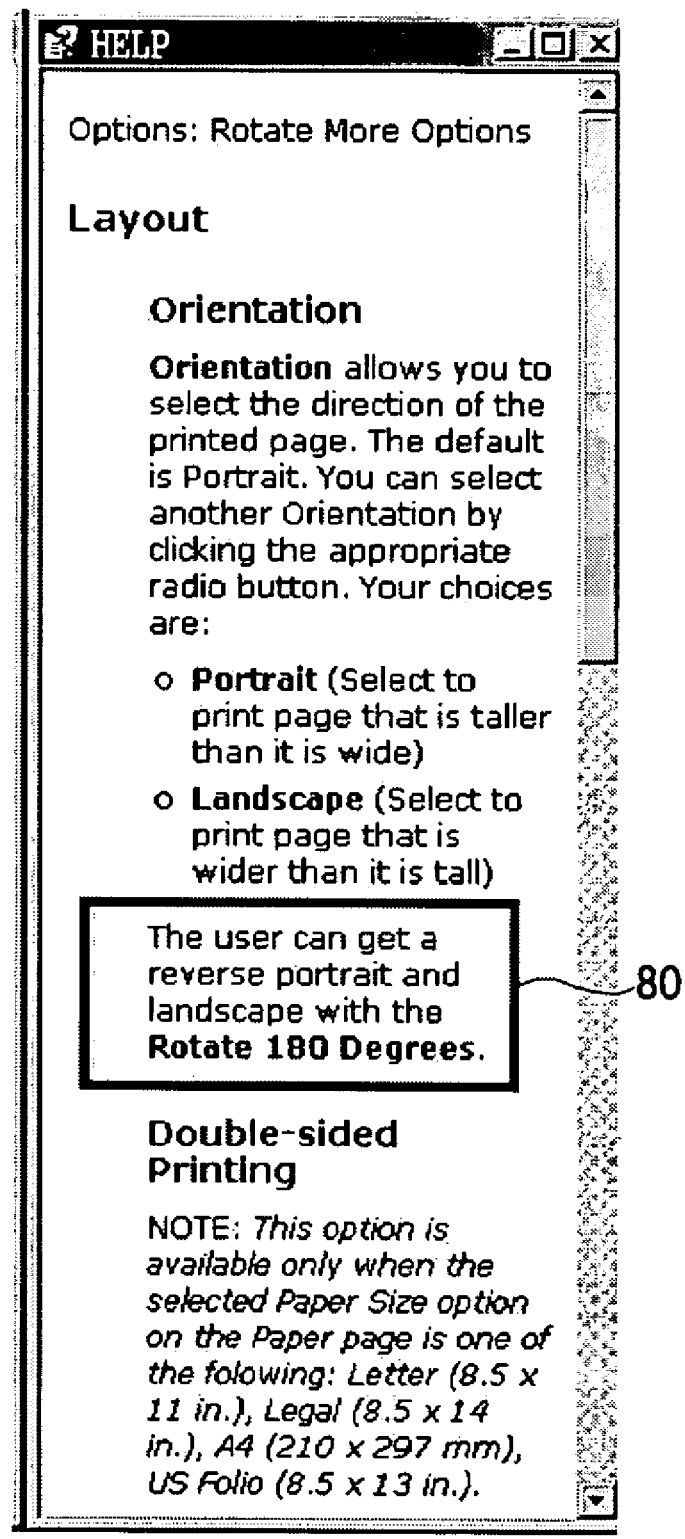
FIG. 7B is a diagram showing a help message with a rotate function in the method of FIG. 6.

An example of a help message changed according to the Rotate parameter field value will be described with reference to FIGS. 7A and 7B. FIG. 7A is a diagram showing a help message without the description of the rotate function, and FIG. 7B is a diagram showing a help message with the description of the rotate function. Referring to FIGS. 7A and 7B, as shown in FIG. 7A, when the Rotate parameter field value is 0, the description of the function of rotating the printing direction of a document by 180° is not included. On the other hand, as shown in FIG. 7B, when the Rotate parameter field value is 1, the description 80 of the function of rotating the printing direction of a document by 180° is included.

As described above, the help file according to the present general inventive concept uses a Compiled HTML (CHM) having a large number of HTML files. Since HTML is a language using an interpreter, a result corresponding to the input parameter is outputted when the HTML is opened. That is, when a user interface opens the HTML file, a help message of the HTML file can be displayed differently, according to the field values of the parameters provided by the user interface.

Figure 8:
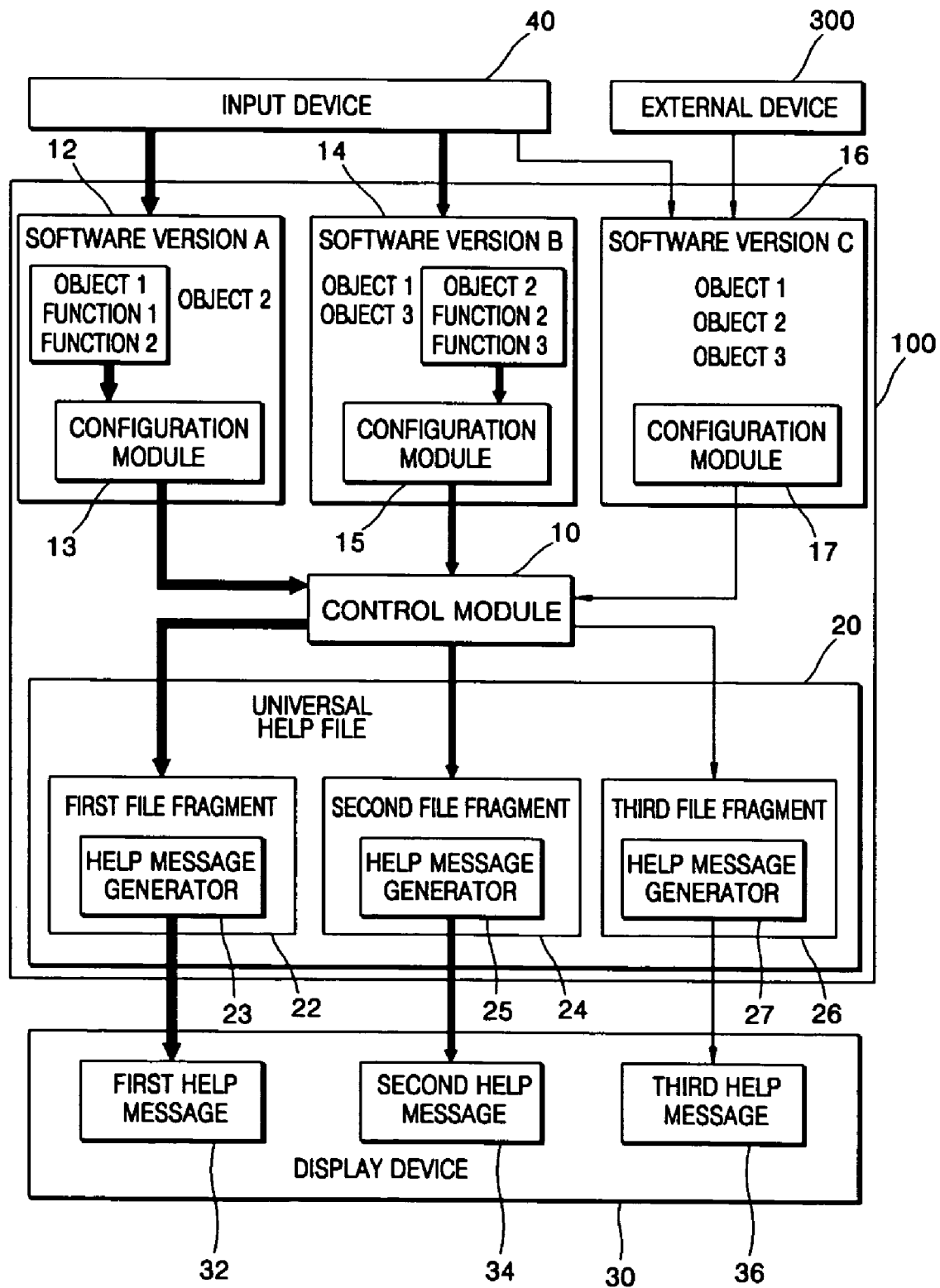
FIG. 8 is a block diagram showing a help message generating system according to another embodiment of the present general inventive concept.

FIG. 8 is a block diagram showing a help message generating system according to another embodiment of the present general inventive concept. Referring to FIG. 8, the help message generating system includes a computer 100, an input device 40, and a display device 30.

The input device 40 requests the computer 100 to provide a help message about an object in a predetermined software version. The computer 100 includes a plurality of software versions 12, 14, and 16 each having a plurality of objects. The software versions 12, 14, and 16 include configuration modules 13, 15, and 17, respectively. Each of the configuration modules 13, 15, and 17 determines identification information regarding each of a plurality of functions of each object, and characteristic data regarding a corresponding software version.

The computer 100 includes a universal help file 20 including function descriptions for all software versions provided in the computer 100. The universal help file 20 receives the identification information and the characteristic data and generates a help message regarding the object based on the function descriptions. The function descriptions include a section filled with the characteristic data.

The computer also includes a control module 10. The control module 10 receives the identification information and the characteristic data from each of the configuration modules 13, 15, and 17 and transmits the received identification information and characteristic data to the universal help file 20.

The universal help file 20 includes first, second, and third file fragments 22, 24, and 26 corresponding to the respective objects. The first, second, and third file fragments 22, 24, and 26 include help message generators 23, 25, and 27, respectively, and the function descriptions for all of the software versions. Each of the help message generators 23, 25, and 27 generates a help message regarding the object using the function descriptions according to the identification information and the characteristic data. In detail, each of the help message generators 23, 25, and 27 deletes descriptions of functions that the object does not have from the function descriptions according to the identification information, and inserts the characteristic data into a corresponding section, thereby generating a help message. The characteristic data may include a name and an Internet address of a software manufacturer or a printer manufacturer.

Based on the received identification information and characteristic data, the control module 10 selects one of the first, second, and third file fragments 22, 24, and 26 corresponding to one of the plurality of objects, and transmits the identification information and the characteristic data to the selected file fragment.

The display device 30 displays one of the first, second, and third help messages 32, 34, and 36 generated in the universal help file 20 as the help message.

The software version includes a printer driver, and an external device 300 includes a printer. Accordingly, when the input device 40 requests the computer 100 to provide the help message regarding the printer driver, the help message corresponding to a particular function can be displayed.

Figure 9:
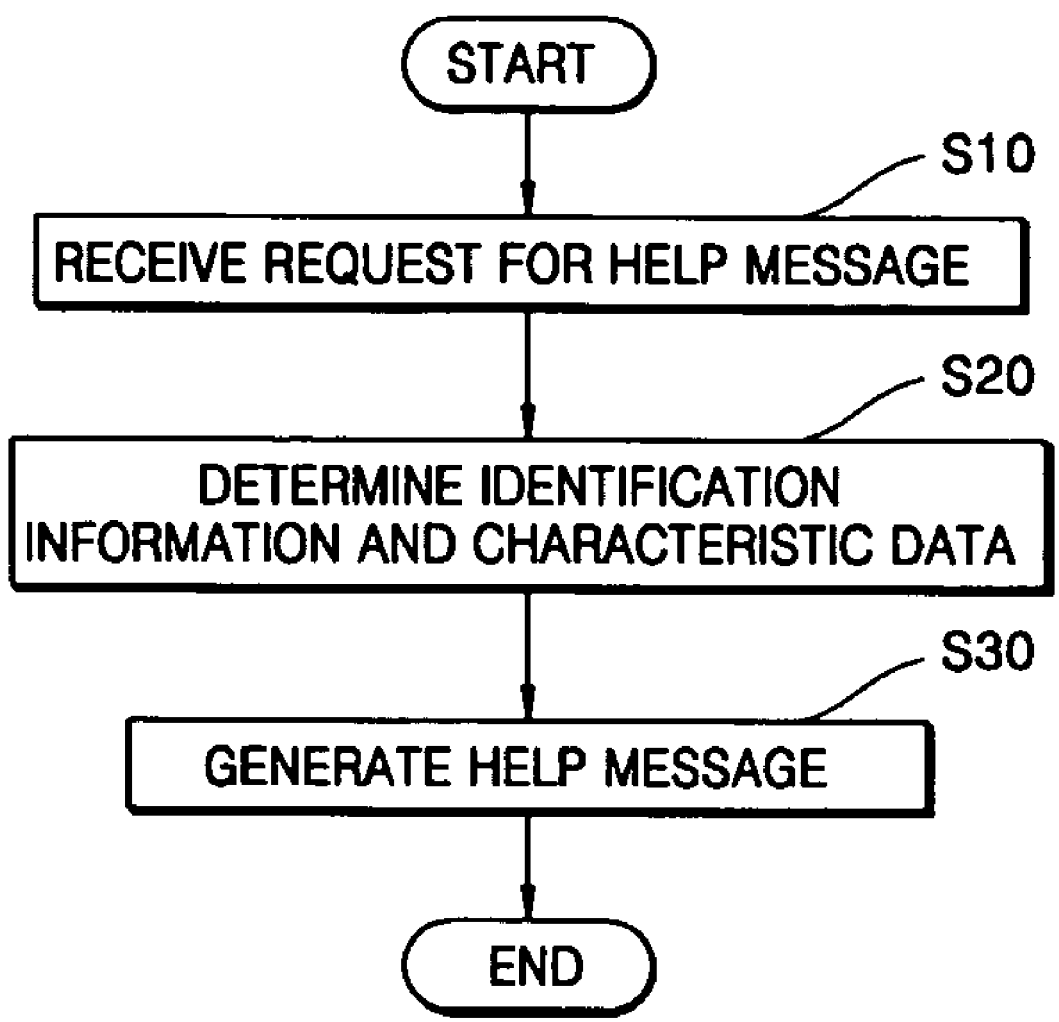
FIG. 9 is a flowchart showing a help message generating method according to another embodiment of the present general inventive concept.

FIG. 9 is a flowchart showing a help message generating method according to another embodiment of the present general inventive concept. The method includes generating a help message regarding a particular one of a plurality of objects included in a particular one of a plurality of software versions in a system, for example, a computer, and receiving a request to provide the help message regarding the particular object in the particular software version in operation S10.

In response to the request, identification information regarding each of a plurality of functions of the particular object, and characteristic data regarding the particular software version are determined in operation S20.

Next, in a universal help file including function descriptions for all software versions provided in the computer, the help message regarding the particular object is generated using the function descriptions according to the identification information and the characteristic data in operation S30. In operation S30, descriptions of functions that the object does not have are deleted from the function descriptions according to the identification information, and the characteristic data is inserted into a corresponding section in the function descriptions.

The generated help message is displayed on a predetermined display device.

Figure 10:
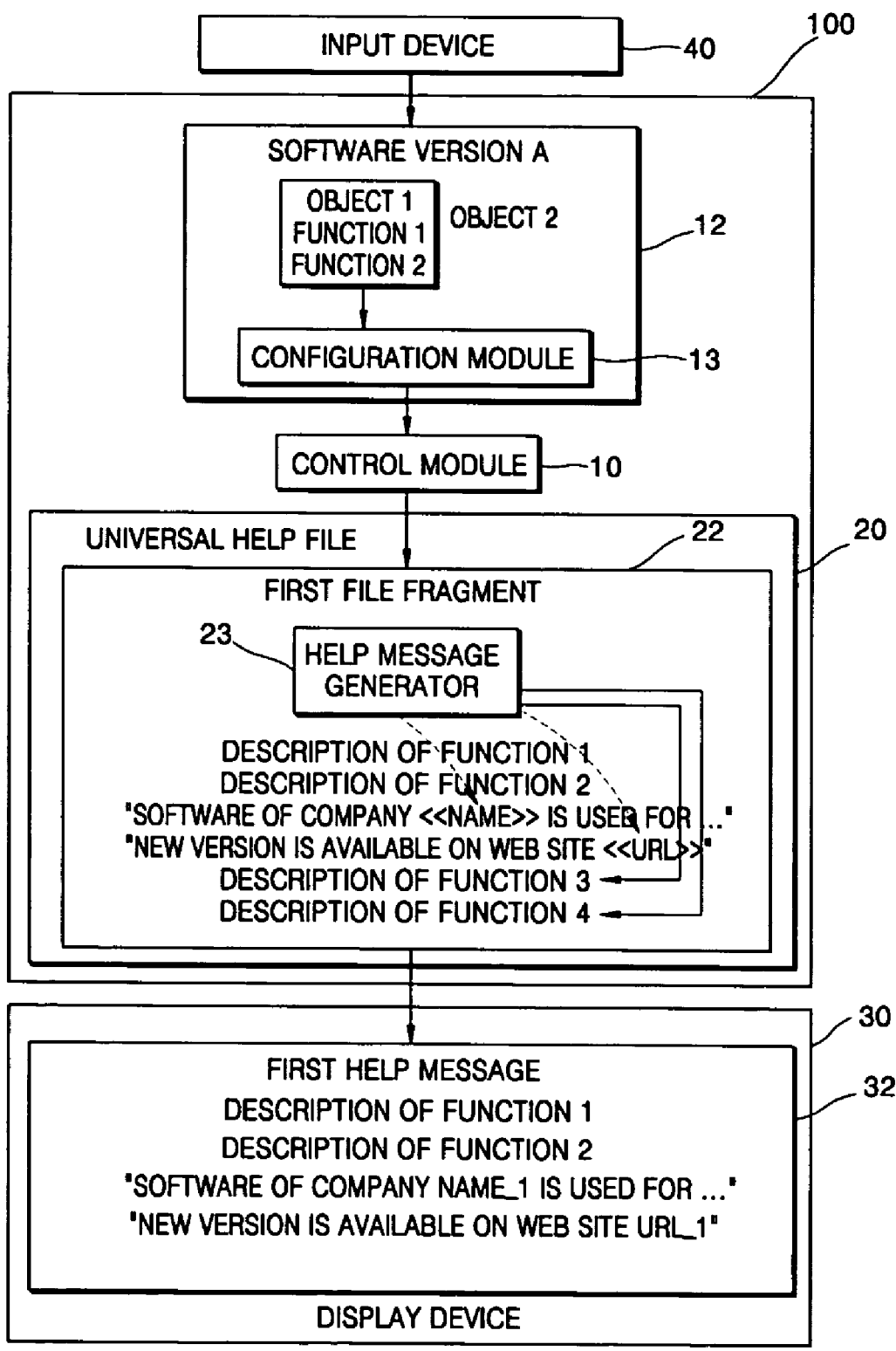
FIG. 10 is a diagram showing a method of generating a help message using a help message generating system according to another embodiment of the present general inventive concept.

FIG. 10 is a diagram showing a method of generating a help message using a help message generating system according to another embodiment of the present general inventive concept. An input device 40 requests to provide a help message regarding an object 1 of a software version A 12. A configuration module 13 included in the software version A 12 determines identification information regarding functions, i.e., a function 1 and a function 2, of the object 1. In addition, the configuration module 13 may determine the identification information regarding the functions, i.e., a function 3 and a function 4 that the object 1 does not have, to indicate that descriptions of the function 3 and the function 4 must be deleted from the help message regarding the object 1.

The configuration module 13 transmits the determined identification information to the control module 10. Then, the control module 10 selects a first file fragment 22 corresponding to the object 1 in a universal help file 20 based on the identification information and transmits the identification information to a help message generator 23 of the selected first file fragment 22. The help message generator 23 deletes the descriptions of the function 3 and the function 4 from the first file fragment 22 according to the identification information to generate a first help message. Accordingly, the first help message includes descriptions of the function 1 and the function 2.

In addition, when the first help message 32 regarding the object 1 of the software version A 12 is generated, the configuration module 13 may determine characteristic data regarding the software version A 12. The characteristic data may include a name, e.g., NAME__1, and an Internet address, e.g., URL__1, of a manufacturer of the software version A 12. The characteristic data is transmitted to the help message generator 23 through the control module 10. The help message generator 23 inserts the characteristic data into corresponding sections in the description of the function 2.

Accordingly, the first help message 32 includes the descriptions of the function 1 and the function 2 and the characteristic data regarding the software version A with respect to the object1. The help message generating system 100 transmits the first help message 32 to a display device 30, and the display device 30 displays the first help message 32.

As described above, this general inventive concept makes it possible to generate a help file used commonly in different models of a plurality of image forming apparatuses. The general inventive concept is capable of adding to a help message one or more descriptions of different functions of the image forming apparatuses.

Therefore, a development time of a driver including a help file can be shortened, and the help file can be managed easily.

In addition, when only a name of a manufacturer is different like a case of original equipment manufacturer (OEM), a help message can be easily generated.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system for generating a help message in a computer, the system comprising:
   an interface unit connected to an external device and configured to have a configuration module to determine identification information regarding each of a plurality of functions of a particular one of a plurality of objects included in a particular one of a plurality of software versions, and characteristic data regarding the particular software version; and
   a universal help file unit to communicate with the interface unit and to store a universal help file including all of the function descriptions corresponding to the plurality of software versions provided in the computer, to receive the identification information and the characteristic data, and to generate a help message to be displayed in a display unit regarding the particular object using the function descriptions according to the identification information and the characteristic data,
   wherein the function descriptions comprise a section filled with the characteristic data.

2. The system of claim 1, further comprising:
   a control module to receive the identification information and the characteristic data from the configuration module and transmitting them to the universal help file unit.

3. The system of claim 2, wherein:
   the universal help file comprises a plurality of file fragments corresponding to the plurality of objects, each of the file fragments comprising a help message generator and the function descriptions corresponding to the software versions, the help message generator generating the help message regarding the particular object using the function descriptions according to the identification information and the characteristic data; and
   the control module selects one of the file fragments corresponding to the particular object based on the identification information and the characteristic data, and transmits the identification information and the characteristic data to the selected file fragment.

4. The system of claim 3, wherein the help message generator deletes descriptions of functions that the particular object does not have, according to the identification information, and inserts the characteristic data into a section of the function descriptions to generate the help message.

5. The system of claim 1, further comprising:
   an input device to request to provide the help message regarding the particular object included in the particular software version.

6. The system of claim 1, further comprising:
   a display device to display the help message generated by the universal help file.

7. The system of claim 1, wherein the characteristic data comprises at least one of a name and an Internet address of a manufacturer of the particular software version.

8. The system of claim 1, wherein the plurality of software versions are formed in software, and the software comprises a printer driver.

9. The system of claim 1, wherein the universal help file generates the help file according to a setting value indicating one of the functions provided by one of a plurality of image forming apparatuses.

10. A method of generating a help message for an object of a software version in a system including a computer, the method comprising:
    receiving a request to provide a help message regarding a particular one of a plurality of objects included in a particular one of a plurality of software versions;
    determining identification information regarding each of a plurality of functions of the particular object, and characteristic data regarding the particular software version; and
    generating the help message regarding the particular object using one or more function descriptions according to the identification information and the characteristic data in a universal help file,
    wherein the universal help file includes a plurality of function descriptions corresponding to the plurality of software versions provided in the computer.

11. The method of claim 10, wherein the generating of the help message comprises:
    deleting descriptions of functions that the object does not have from the function descriptions according to the identification information; and
    inserting the characteristic data into a corresponding section in the function descriptions.

12. The method of claim 10, further comprising displaying the generated help message.

13. The method of claim 10, wherein the generating of the help message comprises:
    forming the help message according to a setting value indicating a function provided by one of a plurality of image forming apparatuses.

* * * * *